United States Patent Office 3,278,518
Patented Oct. 11, 1966

3,278,518
PROCESS FOR PREPARING NUCLEOSIDES
Gerhard Schramm, Tubingen, Horst Grötsch, Frankfurt am Main, and Wolfgang Pollmann, Sinzheim, Baden, Germany, assignors to Farbwerke Hoechst Aktiengesellschaft vormals Meister Lucius & Brüning, Frankfurt am Main, Germany, a corporation of Germany
No Drawing. Filed July 9, 1964, Ser. No. 381,531
Claims priority, application Germany, May 24, 1961, F 33,985
6 Claims. (Cl. 260—211.5)

This application is a continuation-in-part of our earlier copending application Serial No. 196,444, filed May 21, 1962 and now abandoned.

The present invention relates to a process for preparing nucleosides from sugars, pyrimidine and purine bases, respectively, in the presence of cyclic polyphosphoric acid lower alkyl ester.

Up to now, nucleosides could be prepared synthetically with utmost difficulty only. Nucleosides are very important compounds, as they occur in many pharmaceutically important natural products and as they are also antibiotically active.

In general, nucleosides have been prepared by first chlorinating the base, therefrom preparing the HgCl or Ag salt and reacting the latter with the $C_1$-halide of a paracetylated sugar. The next reaction steps are then deacetylation of the sugar and reductive separation of the halogen by means of a catalyst. However, the yields are very small owing to the great number of reaction steps. Further, the halides of the ketoses, in particular those of the 2-desoxyaldoses and of the 2-desoxy-2'-aminoaldoses, are very unstable. Therefore, the synthesis of desoxyadenine, in a yield of below 1%, was realized for the first time by H. Venner only as late as 1960 (Chem. Ber. 93., 140 (1960)). Further, it was found that the Ag or Hg salts of the various bases react only with difficulty with the sugar halides and that they decompose when heated.

Now, we have found that nucleosides can be prepared in simple manner and in good yields by causing a pyrimidine or purine base, in an excess quantity, to act on a sugar in the presence of a cyclic polyphosphoric acid alkyl ester.

As sugars there are used for the process monosaccharides having from five to six carbon atoms in a straight chain and apurine acids. More accurately, pentoses and hexoses such as arabinose, xylose, lyxose, allose, altrose, gulose, talose, idose, psicose, sorbose and especially ribose, fructose, glucose, mannose and galactose enter into consideration.

In addition to these simple sugars, there may also be used sugar derivatives having a free carbonyl function, for example, desoxy sugars such as rhamnose, digitalose, fucose, and desoxyribose, amino sugars such as glucosamine and galactosamine and acylated aminosugars, for example, N-acetylglucosamine, N-acetylgalactosamine, and N-acetylmannosamine.

Important starting materials are also apurine acids which, as is known from J. Biol. Chem. Bd. 195 (1952) page 49, are formed by separating the purine residues from nucleic acids, in a weakly acid solution, whereby the aldehyde function of the ribose or of the desoxyribose is set free, without the degree of polymerisation of the nucleic acids being affected.

As pyrimidine bases there are mentioned cyrosine, 5-methylcytosine, 5-hydroxymethylcytosine, uracil, 5-aminouracil, 4-aminouracil, 4,5-diaminouracil, 5-hydroxyuracil, 5-chloruracil, 5-bromuracil, 2-thiouracil, thymine and oritic acid. Especially suited are 5,5-disubstituted derivatives of barbituric acid such as Evipan. As purine derivatives there enter into consideration: purine, 2-aminopurine, 6-methylaminopurine, 6-dimethylaminopurine, 2-methyladenine, 2,6-diaminopurine, hypoxanthin, isoguanine, 2,8-dihydroxyadenine, mercaptopurine, 6-mercapto-2-aminopurine, thiophylline, uric acid and especially adenine and guanine.

As condensation agents there are used cyclic polyphosphoric acid lower alkyl ester (metaphosphoric acid lower alkyl esters) wherein the lower alkyl component is methyl, propyl, isopropyl and especially ethyl. A very suitable condensation agent is obtained by the method described in Berichte 43 (1910) page 1857. As is explained in Liebigs Ann. Chem. 572 (1952) pages 173–189, this reaction produces a mixture of isometaphosphoric acid ethyl ester and tetrametaphosphoric acid ethyl ester.

The course of the reaction is illustrated by the example of adenosine preparation:

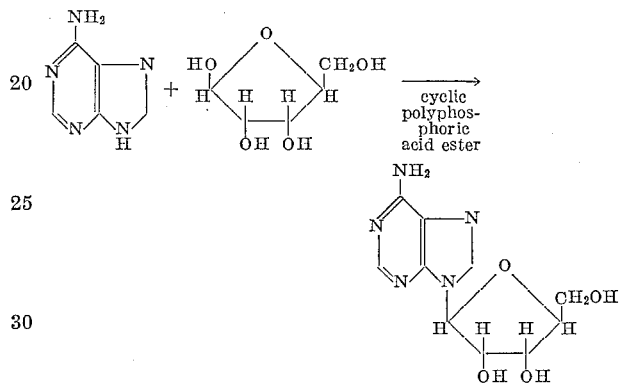

The cyclic polyphosphoric acid alkyl ester reacts at first with the acetalic hydroxyl group of the sugar in forming a reactive compound which no longer exhibits reducing properties nor an aldehyde function. By working up the active compound with glucose, glucose-1-phosphate is obtained. Thus, it seems sure that the acetalic hydroxyl group is first esterified by the cyclic polyphosphoric acid ester. However, the active compound is not identical with the 1-phosphate, since the latter is not reactive. It is particularly to be noted that the acetalic OH group is activated preferably by the cyclic polyphosphoric acid ester and that it is, therefore, not necessary to protect the remaining OH groups as in conventional processes. Thus, the process of the present invention represents a considerable simplification of the synthesis of nucleosides.

It is assumed that the configuration of the electrons at the $C_1$-atom is modified by the cyclic polyphosphoric acid ester residue in such a manner that substitution by a pyrimidine or purine base can easily take place. It is remarkable that pyrimidine or purine bases which contain in addition an amino group, for example, aminopurine, the nitrogen atom positioned in the ring reacts preferably. For example, from adenine and ribose, 9-β-ribosyladenine is formed.

The process of the present invention is advantageously carried out by causing a pyrimidine or purine base in excess quantity to act on sugar in the presence of a cyclic polyphosphoric acid ester. Advantageously, an excess quantity of nitrogen base is dissolved in an inert solvent, cyclic polyphosphoric acid ester is added, and a solution of the sugar is slowly added. Since the yields are the higher the more base is used, it is preferred to use in general 1.5 to 20 parts of base per 1 part of sugar. The reaction according to the present invention can also be carried out with molar quantities of sugar and base, but a considerable polycondensation of the sugar must then be put up with. The excess of base can be increased over the indicated ratio, for example, up to 100 times the quantity, which, however, does not essentially improve the results. The products of the present invention are advantageously isolated by first evaporating the solvent or precipitating the reaction products, for example, with ether, and removing the solvent. The reaction product is then combined with water, whereby the cyclic polyphosphoric acid ester is degraded in orthophosphate. The phosphate is removed, for example, with the aid of barium hydroxide, and in the concentrated mother liquor the nucleosides are further purified in the usual manner by crystallization or by chromatography. Alternatively, the reaction products can be first precipitated by chloroform or a similar polar solvent, unreacted cyclic polyphosphoric acid esters remaining in solution, and subsequently purifying the precipitated nucleosides.

The temperatures to be used depend, of course, on the chemical nature of the reactants. In general, temperatures in the range of 0 to 65° C. have proved suitable. Maximum yields require a time of reaction of 15 to 24 hours, but the reaction might be carried out under similar conditions even in a time of as short as one hour.

As solvents for the process of the present invention, there are suitable those in which the sugars and the bases are easily soluble and which themselves do not react with the reactants. There may be used in particular diethylphosphite, phosphoric acid-tri-dimethylamide, dimethyl sulfoxide, N-methylpyrrolidone, formamide, or, especially, dimethylformamide. The presence of small quantities of water is not disturbant. Moreover, one may also operate in aqueous solution, though with lesser yields.

By the process of the present invention the nucleosides can be prepared in one step from the starting materials, thus making unnecessary the cumbersome preparation of sometimes unstable intermediates such as sugar-1-halides, the esterification of the hydroxyl groups of the sugar molecules and the use of Ag or HgCl salts of the bases. The process is further distinguished by very mild reaction conditions, so that it can also be used for sensitive reactants.

A further remarkable advantage is that neither the components nor the solvents must be used in anhydrous form, so that, for example, there can also be used the ordinary crystal-water containing glucose. Finally, also the excess quantity of the base can be easily recovered in unmodified form.

Owing to their pharmaco-dynamic activity, the products of the present invention can be used partly directly as medicaments, partly as intermediates for the preparation of pharmaceutics. Thus, for example, adenosine can be used as agent having a favourable action on the circulation, while psicofuranine is used as a cytostatic. Further, for example, the compounds puromycine, nebularine, nucleocidine, tubercidine, toyocamycine, mercaptopurine-riboside and 2,6-diamino-purine-riboside, which can be prepared by the process of the present invention, are distinguished by antibiotic activity. The nucleic acids obtained when using apurine acids in the process of the present invention exhibit a considerable action on cell metabolism and can be used as cytostatics, for example, as inhibitors of bacterial, or for the transformation of organisms, for example, for preparing virus-mutants.

The following examples illustrate the invention but they are not intended to limit it thereto:

*Example 1.—9-N[1'β-ribosyl]-adenine*

1 g. of adenine was dissolved in 50 cc. of dimethylformamide with the addition of a few drops of concentrated hydrochloric acid, 5 g. of cyclic polyphosphoric acid ethyl ester were added, and while slowly stirring 100 mg. of D-ribose dissolved in 50 cc. of dimethylformamide were added dropwise. After a reaction period of about 20 hours at 50–60° C., the solution was poured into chloroform. The reaction mixture was thereby precipitated, while unreacted polyphosphoric acid ester remained in solution. For purification, the precipitate was dissolved in water, the solution was combined with a barium hydroxide solution and an equal volume of ethanol, then neutralized with sulfuric acid, the barium sulfate which had precipitated was removed by centrifugal action, and the remainder was concentrated in a rotation evaporator whereby the major part of the adenine precipitated. The adenosine was then purified according to W. E. Cohn (J. Am. Co., 72, 1471 (1950)) by passage through a Dowex-1-formiate ion-exchange column. Purification over a Dowex-1-borate column according to J. X. Khym and W. E. Cohn (The Nucleic Acids, I., page 237) was equally effective.

The yield of adenosine referred to the ribose quantity used was 40%. The adenosine obtained was found to be identical with the authentic compound, as was proved by comparison of the infra-red and ultraviolet spectrums of this compound with those of the authentic compound.

By systematic variation of the reaction conditions it was found that the yield of nucleoside depended on the ratio of quantities of base/sugar. With a ratio of 2:1, the yield was 10–20%, with a ratio of 10:1 it was 40% and with a ratio of 20:1 it was about 80%, each time referred to the quantity of sugar used.

*Example 2.—9-N[1'β-(2'-desoxy)-ribosyl]-adenine*

500 mg. of adenine were dissolved, as described above, with the addition of some drops of concentrated hydrochloric acid, in 20 cc. of dimethylformamide. To this solution was added 0.5 g. of cyclic polyphosphoric acid ethyl ester, and then there were added dropwise, with stirring and during 5 hours, 50 mg. of 2'-desoxyribose, dissolved in 10 cc. of dimethylformamide. After standing for about 20 hours at 50–60° C., the reaction solution was worked up as described in Example 1 by fractional crystallization and column chromatography. The yield was 30%, referred to the 2'-desoxyribose used. The 2'-desoxy-adenosine was identified by comparing its ultraviolet extinction curve with that of an authentic sample of the $R_f$-values.

*Example 3.—N(2'-fructosyl)-adenine*

500 mg. of adenine were dissolved, as described above, in 20 cc. of dimethylformamide, with the addition of a small quantity of concentrated hydrochloric acid, about 0.5 g. of cyclic polyphosphoric acid ethyl ester were added, and then there were added dropwise during 5 hours 50 mg. of D-fructose dissolved in 10 cc. of dimethylformamide. The reaction conditions and method of working up were analogous to those described in Example 1. The yield of fructosyl-adenine, referred to the fructose used, was almost quantitative. Upon hydrolysis, the reaction product gave again adenine and a sugar component, which had, chromatographically, the same behaviour as fructose.

Ultraviolet absorption λmax 285μ
$R_f$-value in a system of amylalcohol/secondary phosphate of 5% strength (1:1)=0.82.

*Example 4.—9-N[1'-(2'-desoxy-2'-N-acetylamino)-glucosyl]-adenine*

According to the method described in Example 1, there was obtained by the reaction of 500 mg. of adenine, in 20 cc. of dimethylformamide, with the addition of 0.5 g. of cyclic polyphosphoric acid ethyl ester, and 50 mg. of N-acetylglucosamine dissolved in 10 cc. of dimethylformamide, the above-identified compound in a yield of about 30%, referred to N-acetylglucosamine.

Ultraviolet absorption λmax 260μ
$R_f$-value in a system of amylalcohol/secondary phosphate of 5% strength (1:1)=0.73.

*Example 5.—9-N(2'-desoxy-2'-amino-glucoxyl)=adenine*

500 mg. of adenine and 4 g. of polyphosphoric acid ethyl ester were dissolved in 75 ml. of dimethylformamide, with stirring and 100 mg. of D-glucosamine hydrochloride were added to the solution. After a reaction time of 3 hours at 50° C., dimethylformamide was removed by distillation under reduced pressure, the residue was dissolved in water and neutralized with a sodium hydroxide solution. The nucleoside was then isolated with a sodium hydroxide solution. The nucleoside was then isolated from the solution by chromatography in a yield of 20% as a uniform substance. RF-value in a system of butanol/glacial acetic acid/water (5:1:4)=0.36 compare the RF-values of adenosine=0.407 and adenine=0.513, in the same chromatographic system). Ultraviolet absorption: λmax 260μ

*Example 6.—9-N(D-ribosyl)-1-methyl-5-methyl-5-cyclohexenyl-barbituric acid*

500 mg. of 1-methyl-5-methyl-5-cyclohexenyl-barbituric acid (Evipan) and 1.3 g. of polyphosphoric acid ethyl ester were dissolved in 75 ml. of dimethylformamide; and 100 mg. of D-ribose were added, while stirring to the solution. After a reaction time of 4 hours at 50° C. dimethylformamide was removed by distillation under reduced pressure and the residue was dissolved in about 5 ml. of water, whereupon unreacted 1-methyl-5-methyl-5-cyclohexenyl-barituric acid precipitated. The ribose of 1-methyl-5-methyl-5-cyclohexenyl-barbituric acid was isolated from the solution in a yield of 22% as a uniform substance.

RF-value in a system of amylalcohol/sec. phosphate of 5% strength (1:1)=0.56 (compare the RF-value of 1-methyl-5-methyl-5-cyclohexenyl-barbituric acid in the same system=0.11). The ultraviolet spectrum resembled that of 1-methyl-5-methyl-5-cyclohexenyl-barbituric acid, but was not identical with it. When sprayed with silver nitrate, the substance exhibited the sugar reaction typical for ribosides. Remarkable was the strongly increased solubility in water, in comparison to that of 1-methyl-5-methyl-5-cyclohexenyl-barbituric acid.

*Example 7.—Incorporation of adenine into apurine acid*

A solution of 1 g. thymus desoxyribonucleic acid in 100 cc. of water was adjusted to a pH-value of 2.4 by the addition of hydrochlorid acid and maintained at 37° C. during 20 hours. The purine bases were thereby split off to a great extent. Hydrolysis of the apurine acid so obtained showed in the chromatogram no noteworthy quantities of adenosine and guanosine. By dialysis against increasing concentrations of dimethylformamide, the apurine acid was transferred into pure dimethylformamide. To this solution (about 120 cc.) were added about 5 g. of cyclic polyphosphoric acid ethyl ester. Then, 1 g. of adenine and some droplets of concentrated hydrochlorid acid were dissolved in 60 cc. of dimethylformamide and this solution was added, while stirring, to the solution of apurine acid cyclic phosphoric acid ethyl ester. After standing for 20 hours at 55° C., the batch was diluted with water and several days dialyzed against water.

In contradistinction to apurine acid, the reaction product no longer showed an aldehyde reaction. The quantity of desoxyadenosine expected by theory could be proved by chromatography, which showed quantitative conversion of the free aldehyde groups of the 2-desoxy-ribose. The natural configuration of the synthetic product was corroborated by the fact that the product was hydrolized by desoxyribonuclease and snake venom diesterase.

*Example 8.—Incorporation of various radioactive heterocycles in apurine acid*

A solution of 160 mg. of adenine in 5 cc. of dimethylformamide was added to a solution of 10 mg. of apurine acid and 0.5 g. of cyclic polyphosphoric acid ethyl ester in 20 cc. of dimethylformamide. The radioactivity of the adenine was 8 μC. In a control test, an equal quantity of phosphoric acid was substituted for the cyclic polyphosphoric acid ethyl ester. After a reaction during 23 hours at 37° C., both batches were further treated in the manner described in Example 5 by dialysis during several days. Comparison of the radioactivity of the test batch with that of the control batch revealed an incorporated quantity of 96%. The incorporation was proved by enzymatical hydrolysis and isolation of the marked 2-desoxyadenosine.

The hereinafter indicated radioactive bases were reacted in analogous manner with the apurine acid and the rate of incorporation was then determined:

guanine: incorporation rate 40%
orotic acid: incorporation rate 40%
thymine: incorporation rate 5%
uracil: incorporation rate 8%.

Pyrimidines were generally more slowly incorporated than purines. However, the rate of incorporation could be increased by prolongation of the incorporation periods.

The cyclic polyphosphoric acid ethyl ester used in the examples was obtained according to the method described in Berichte 43 (1910), page 1857.

We claim:
1. A process of preparing nucleosides which comprises reacting a member selected from the group consisting of monosaccharides having from 5 to 6 carbon atoms in a straight chain and apurine acids, with a member selected from the group consisting of pyrimidine bases and purine bases in the presence of a cyclic polyphosphoric acid lower alkyl ester and of a solvent for said sugar and base, which solvent is inert to said sugar and base, at a temperature of from 0 to 65° C.

2. A process as in claim 1 wherein said monosaccharides are members selected from the group consisting of pentoses, hexoses, desoxy sugars, amino sugars, and N-acylated amino sugars.

3. A process as in claim 1 wherein the pyrimidine base is a member selected from the group consisting of cytosine, 5-methylcytosine, 5-hydroxymethylcytosine, uracil, 5-aminouracil, 4-aminouracil, 4,5-diaminouracil, 5-hydroxyuracil, 5 - chloruracil, 5 - bromuracil, 2 - thiouracil, thymin, orotic acid and 1-methyl-5-methyl-5-cyclohexenyl-barbituric acid.

4. A process as in claim 1 wherein the purine base is a member selected from the group consisting of purine, 2-aminopurine, 6-methylamino-purine, 6-dimethylamino-purine, 2-methyl-adenine, 2,6-diaminopurine, hypoxanthin, isoguanine, 2,8-dihydroxyadenine, mercaptopurine, 6-mercapto-2-aminopurine, theophylline, uric acid, adenine and guanine.

5. A process as in claim 1 wherein the solvent is a member selected from the group consisting of diethylphosphite, phosphoric acid-tri-dimethylamide, dimethylsulfoxide, N - methyl - pyrrolidine, formamide, dimethylformamide and water.

6. A process as in claim 1 wherein the cyclic polyphosphoric acid lower alkyl ester is a member selected from the group consisting of isometaphosphoric acid tetraethyl ester and tetrametaphosphoric acid tetra ethyl ester.

No references cited.

LEWIS GOTTS, *Primary Examiner.*

JOHNNIE R. BROWN, *Assistant Examiner.*